United States Patent [19]
Johnson et al.

[11] Patent Number: 5,992,699
[45] Date of Patent: Nov. 30, 1999

[54] MULTIFACETED PRODUCT TANK

[75] Inventors: Lee Alan Johnson, Coal Valley; Ronald Lee Pratt, Taylor Ridge, both of Ill.

[73] Assignee: Deere & Company, Moline, Ill.

[21] Appl. No.: 09/131,197

[22] Filed: Aug. 7, 1998

[51] Int. Cl.⁶ ............................................. B67D 2/06
[52] U.S. Cl. ..................... 222/185.1; 222/462; 222/608
[58] Field of Search ................................. 222/143, 179, 222/185.1, 460, 462, 608, 173; 220/23.4, 495.06, 581; 52/81.1, 245, 578

[56] References Cited

U.S. PATENT DOCUMENTS

| | | | |
|---|---|---|---|
| 2,293,160 | 8/1942 | Miller et al. | 222/143 |
| 4,379,664 | 4/1983 | Klein et al. | 222/263 |
| 4,541,549 | 9/1985 | Hadley et al. | 222/143 |
| 5,706,624 | 1/1998 | Lipson | 52/745.2 |
| 5,732,514 | 3/1998 | Organ | 52/81.1 |

FOREIGN PATENT DOCUMENTS 1313795  2/1993  Canada ................. 111/33.1

OTHER PUBLICATIONS

Deere & Co., John Deere Parts Catalog PC2348 for 787 Air Seeding System, 2 pages–8–9 dated Oct. 24, 1994, published in the U.S.A.

Brochure—Product Showcase, Flexicoil, pp. 1 and 2, date unknown.

Brochure—820 Tilling Unit, Flexicoil, 6 pages, date unknown but prior to Nov. 18, 1994.

Brochure—Air System 2400, Concord, 2 pages, date unknown but prior to Sep. 30, 1993.

Brochure—Century Sprayers, Century, 4 pages, date unknown but prior to Sep. 29, 1993.

Brochure—7000 Series Air Seeder Tank, 4 pages, Morris Industries Ltd., dated Jun. 1994.

*Primary Examiner*—Andres Kashnikow
*Assistant Examiner*—Jorge Bocanegra

[57] ABSTRACT

A plastic product tank for containing product under pressure has a lower funnel portion including a product outlet and an upper container portion having a product-containing capacity substantially greater than the lower funnel portion. The lower funnel portion and upper container portion are in substantially gas-tight communication with each other and the upper container portion of the tank includes side walls formed by a plurality of substantially planar surfaces adjacent to each other. Each interior angle between adjacent side walls of the upper container portion is greater than ninety degrees.

23 Claims, 4 Drawing Sheets

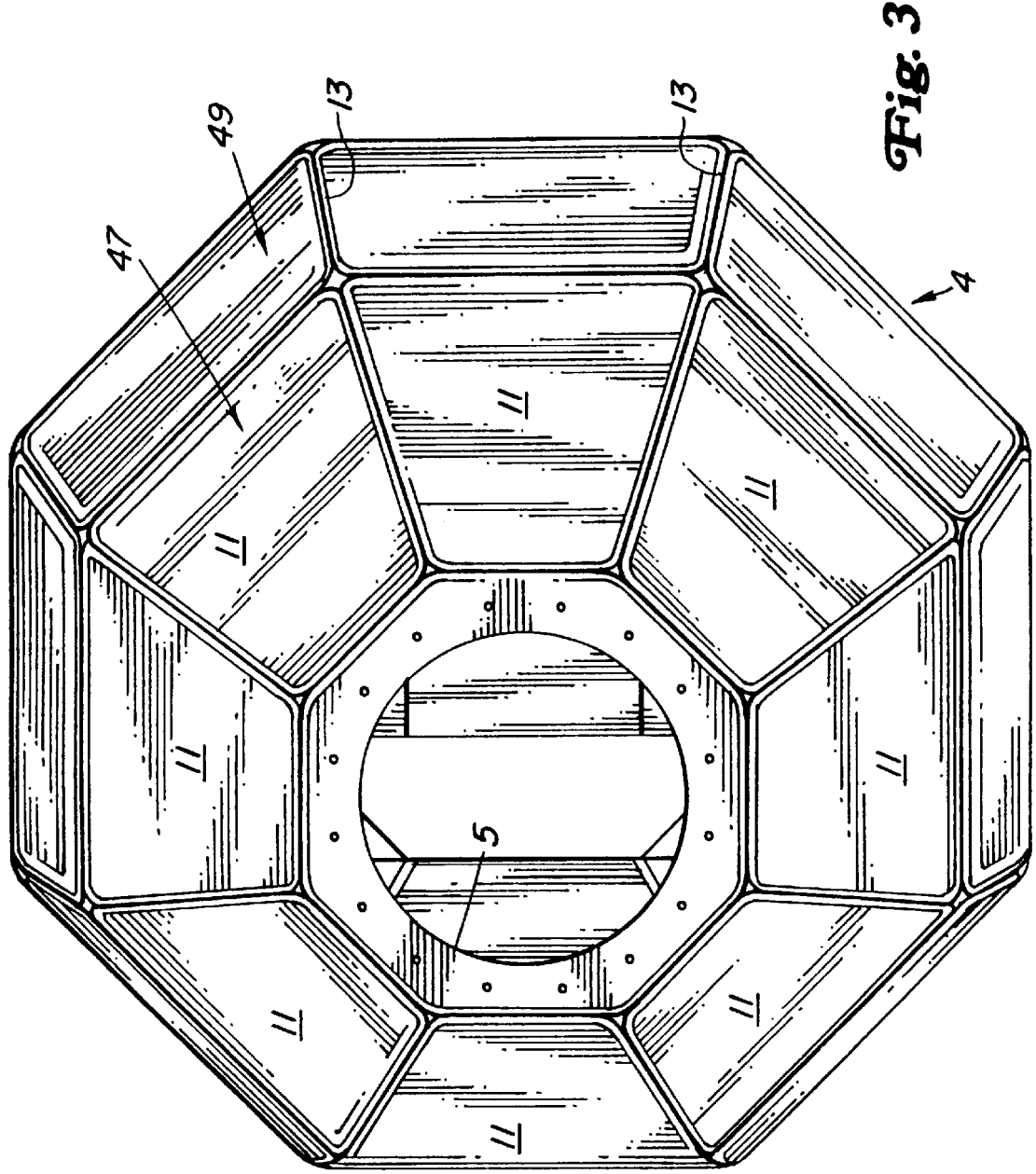

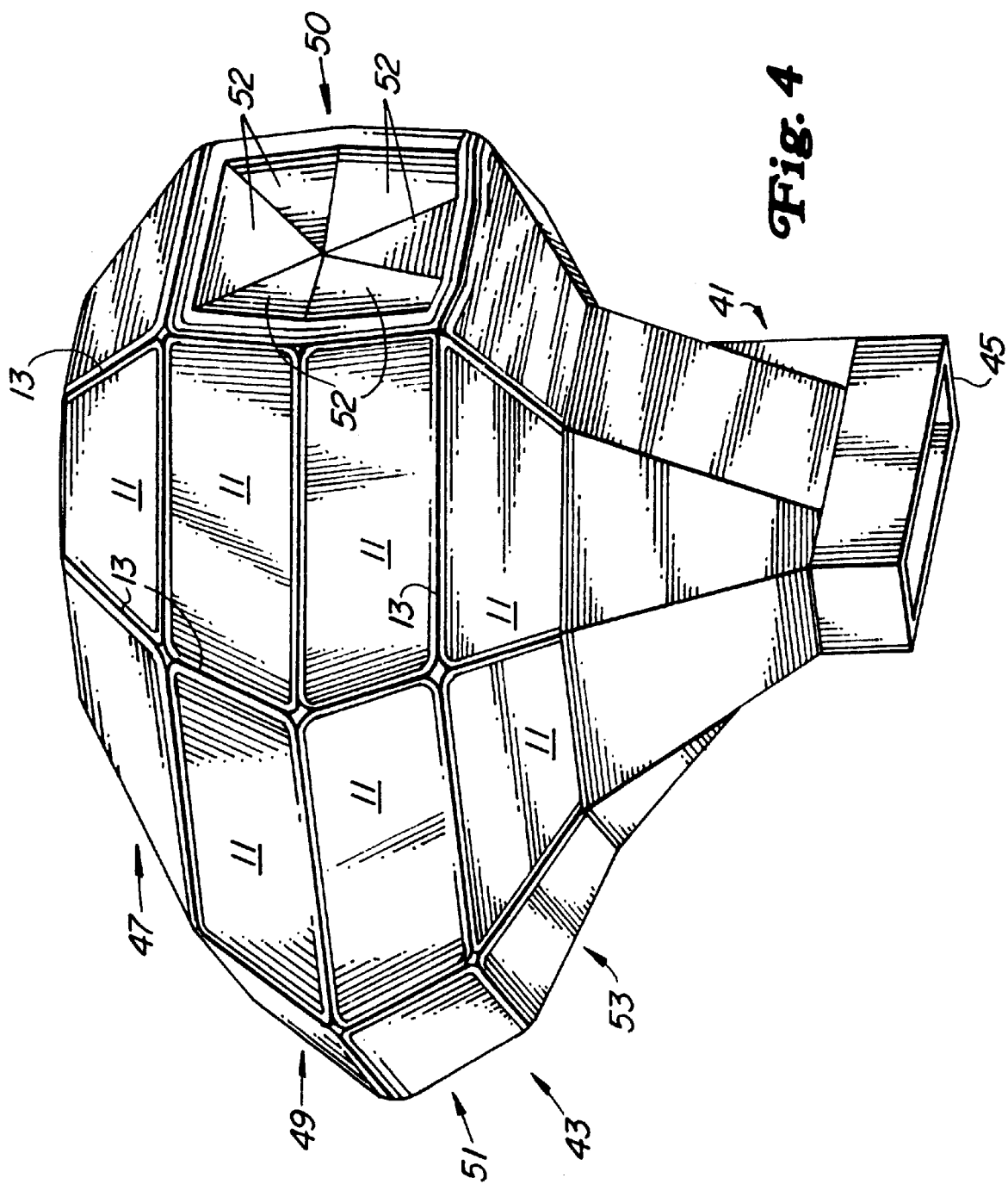

MULTIFACETED PRODUCT TANK

BACKGROUND OF THE INVENTION

1. Field of the Invention

The present invention relates to agricultural product tanks, and more particularly to agricultural product tanks for containing material under pressure.

2. Description of Related Art

Air seeders, sprayers and other similar types of agricultural implements typically include product tanks for bulk storage of material to be distributed by the implement onto or underneath the soil. Those tanks designed for storing and distributing granular material generally include a lower, funnel portion with an angled design to efficiently dispense the granular material, and an upper portion which is generally larger in volume than the funnel portion for increasing storage capacity. These tanks have been fabricated by welding and/or bolting sheet metal panels in a tank configuration on an implement frame. Sheet metal construction is relatively expensive, primarily because a relatively long fabrication time is required to assemble the panels on the support frame. In addition, these metal tanks are relatively heavy and subject to water leakage and corrosion, particularly in tanks which are used to contain fertilizer.

As an alternative to metallic fabrication, the more recent past has seen a progression toward manufacture of such tanks from composites or plastics. These plastic tanks do not corrode as a result of the products transported within the tanks. Also, the plastic tanks overcome most of the water leakage problems attendant metallic construction. In addition, the plastic tanks are generally less expensive to make and weigh less than tanks made from steel.

While plastic product tanks eliminate some of the disadvantages of metallic tanks, plastic tanks heretofore available present another set of problems. For instance, where the tanks are subjected to air pressure as, for example, in a positive pressure air seeding system, a substantial bulging effect is imparted to the surface of the upper portion of the tank. Conventional tanks are known which are generally octagonal when viewed from the side, but which are generally rectangular in plan. These tanks are made up of fairly large panels joined at their edges so that the middle regions of the panels receive insufficient support to withstand pressure and therefore tend to bulge excessively.

Some known plastic tanks have a rounded surface or surfaces in their upper portions, allowing the tank to more easily withstand air pressure because the pressure is more evenly distributed. During periods where such a tank is unpressurized, however, portions of the rounded surfaces tend to become concave (i.e., "cave in"), under their own weight or when they come in contact with the operator or with equipment such as an on-board auger. The amount of air pressure or force due to the weight of product within the tank may not be enough to restore the outwardly convex shape. Over time, the plastic tanks tend to develop a "memory" for the undesirable concave shape and the deformity will remain permanent.

In addition, repeated flexing of the tank weakens the material from which it is constructed and makes it more prone to cracking and failure. When the tanks are unpressurized when loading product, the product itself may be unable to push walls out without the assistance of air pressure. Therefore, the tank may not be filled to nominal capacity. Also, a tank with collapsed walls is not aesthetically appealing.

Conventional tanks typically have four sides in plan and at least 4 corners with interior angles of about 90°. Because these angles are relatively small, the tank must be made thicker to withstand resulting high stress concentrations. The increased thickness represents an increase in cost and weight.

Tanks with irregular shapes have been used, but still have relatively small interior angles between panels. U.S. Pat. No. 4,541,549, the disclosure of which is hereby incorporated by reference, describes such a plastic product tank which has eight sides in plan, yet retains several right angles at joints between side panels.

SUMMARY OF THE INVENTION

It is an object of the present invention to provide a product tank capable of withstanding pressurization and depressurization while maintaining substantially its original form.

It is another object of the invention to provide such a product tank that resists leakage and corrosion.

It is a further object of the invention to provide such a product tank that can be manufactured relatively inexpensively and is lightweight.

The product tank of the present invention utilizes multiple flat surfaces, which are joined to create a polyhedron that approaches a domed shape. Instead of using a basic rectangular shape for the tank, a series of panels are used that not only approximate a domed shape from the side views, but also approximate a domed shape from a plan view. By increasing the number of sides the tank has, the interior angles can be made larger to reduce stress concentrations, which occur when the tank is pressurized. Preferably, the panels are rounded at their intersections so that the stress concentrations may be further diminished while maintaining a strong framework for the tank's structure.

The product tank may have one or more openings at the top and/or the bottom for filling the tank and dispensing product from the tank, but the tank is substantially gas-tight with appropriate closures implemented at the openings.

Some known product tanks have a configuration of greater than four flat surfaces in views other than plan. However, these tanks have several ninety-degree interior angles when viewed from above, which result in stress concentrations. The product tank of the present invention has a dome portion which has more than four sides when viewed from any angle, with every interior angle substantially greater than 90°.

The tank shape allows it to be pressurized without excess deformation, yet will retain its structural integrity when not under pressure. By using a tank configuration with more than four sides in plan and larger interior angles it is possible to more accurately approximate a spherical dome while using more reliable flat surfaces.

BRIEF DESCRIPTION OF THE DRAWINGS

FIG. 3 is a plan view of the product tank of FIG. 2.

FIG. 4 is an isometric view of the product tank of FIGS. 2 and 3 as seen from behind.

DETAILED DESCRIPTION OF THE PREFERRED EMBODIMENT

Figure 1:
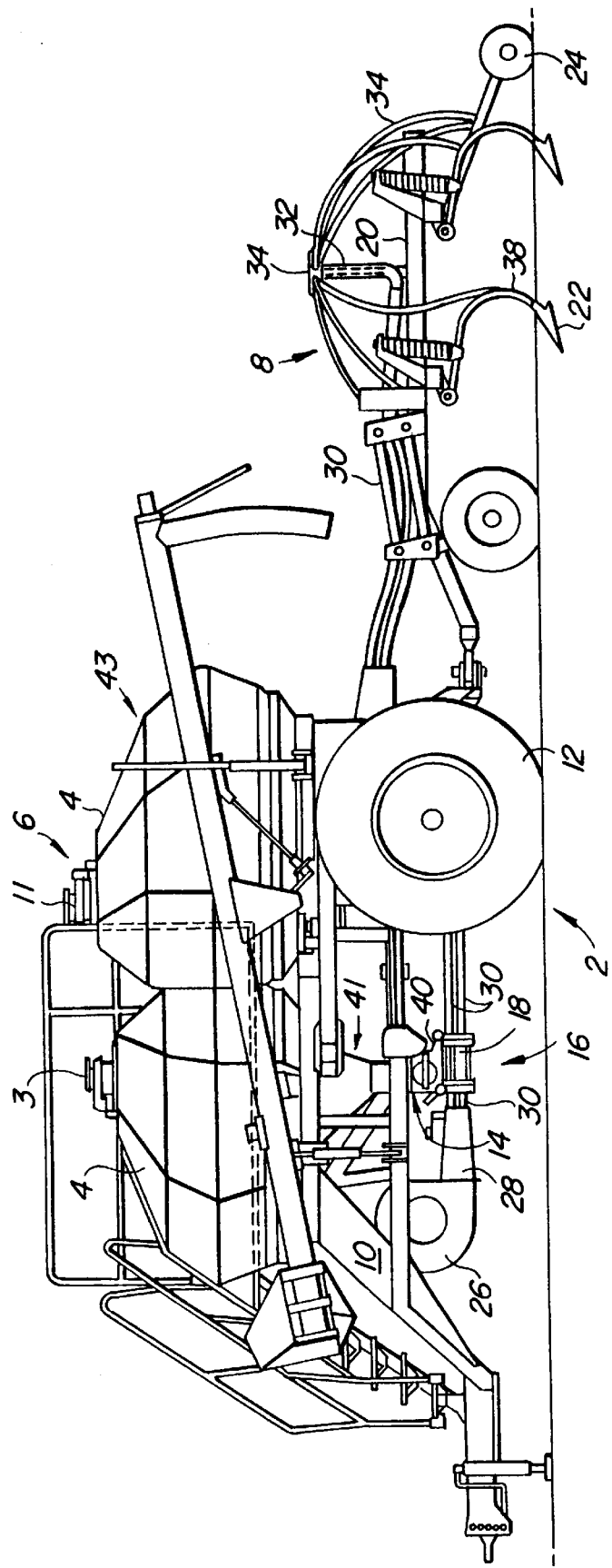
FIG. 1 is a left-side elevation of a commodity cart including two product tanks according to the present invention.

FIG. 1 shows an agricultural implement such as an air seeder 2 including two product tanks 4 constructed according to a preferred embodiment of the present invention. The air seeder 2 comprises a commodity cart 6 towed between a tractor (not shown) and a tilling implement 8. The commodity cart 6 has a frame 10 upon which the product tanks 4 and wheels 12 are mounted. Each product tank 4 has a door 3 releasably sealing an opening 5 (shown in FIGS. 2–3) at its upper end for filling the tank 4 with product, and an associated metering system 14 at its lower end for controlled feeding of product (in this case, granular material) into a pneumatic distribution system 16 at a primary distribution manifold 18. The tilling implement 8, towed behind the commodity cart 6, includes a frame 20 to which ground openers 22 and packers 24 are mounted.

The pneumatic distribution system 16 includes a centrifugal fan 26 which is connected to a plenum 28, which is in turn connected by distribution lines 30 to one or more primary distribution manifolds 18, each associated with a product tank 4. The primary distribution manifolds 8 are connected by distribution lines 30 to a dimpled riser tube 32, which is coupled to a secondary distribution header 34. Distribution lines 36 connect the secondary distribution header 34 to seed boots 38 mounted on the ground openers 22.

Each product tank 4 is pressurized by air from the centrifugal fan 26 conducted, for example, through a meter housing 40 and into the tank 4 by suitable conduit such as a hollow leg of a ladder (not shown). This results in substantially equal pressure above and below the product, urging the product to enter the underlying air stream of the pneumatic distribution system 16. However, the product tank 4 must be sealed correctly during operation to assure accurate product delivery and to avoid "pulsing," an undesirable condition where product is delivered in disjointed batches rather than in a more continuous flow.

During operation of the air seeder 2, air and product flow in the pneumatic distribution system 16 from the primary distribution manifold 18 through distribution lines 30 to the dimpled riser tubes 32 which attempt to randomize distribution of product from the secondary distribution headers 34 which are immediately downstream. The secondary distribution headers 34 divide the product substantially evenly into a series of the distribution lines 36 leading to the seed boots 38 on the ground openers 22.

Figure 2:
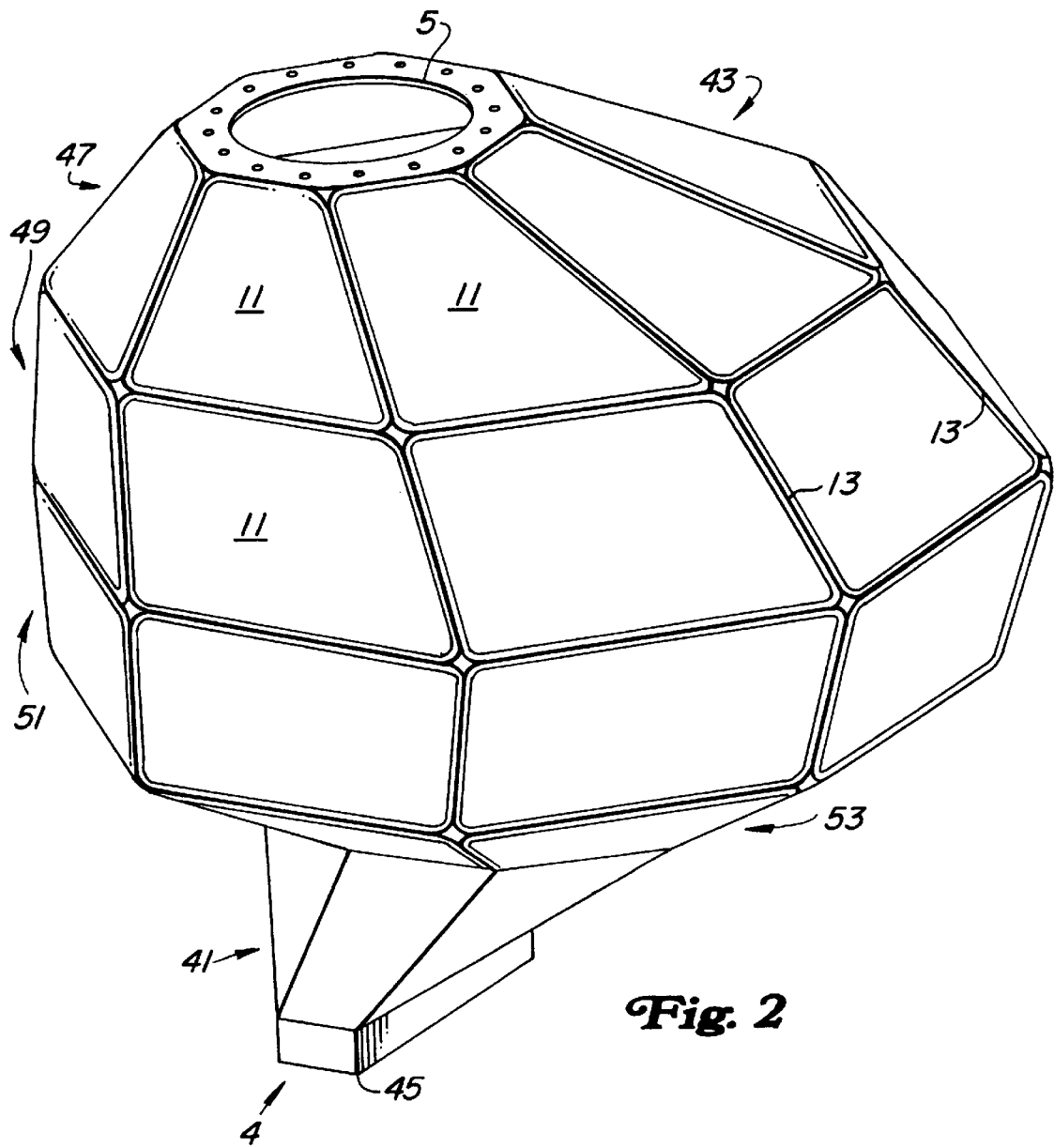
FIG. 2 is an isometric view of a product tank shown in FIG. 1 as seen from above.

The product tank 4 of the preferred embodiment is shown in more detail in FIGS. 2–4. Referring now to FIG. 2, the product tank 4 is made up of a lower funnel portion 41 and an upper domed portion 43, each of which is made up of a plurality of planar surfaces forming side walls 11 of the product tank 4. Joints 13 between adjacent sidewalls 11 are preferably thicker than the sidewalls 11 to provide greater structural integrity. The domed portion 43 has a product-carrying volume substantially greater than the volume of the funnel portion 41 for storing product under pressure. The funnel portion 41 is designed for efficient passage of product from the product tank 4 to the metering system 14 through a material outlet 45 at the lower end of the product tank 4.

The domed portion 43 of the product tank 4 is shown having eight sides in plan (FIG. 3) and at least as many in other views (FIGS. 1, 2 and 4). Although many shapes for a product tank 4 may be devised under the present invention which enjoy the described advantages, the product tank 4 which is eight-sided in plan is advantageous because a side wall 11 of one product tank 4 may efficiently be positioned adjacent a side wall 11 of a second adjoining product tank. The octagonal shape allows for larger interior angles while not having so many sides that a series of adjacent sidewalls 11 and joints 13 are likely to collapse.

The domed portion 43 of the product tank 4 has first, second, third and fourth tiers 47, 49, 51, 53, each including a series of sidewalls 11 which circumscribe the dome portion 43. The first tier 47, closest to the top of the product tank 4, and the fourth tier 53, adjacent the funnel portion 41 of the product tank 4, each consists of eight vertically extending sidewalls 11. The second and third tiers 49, 51 each consist essentially of seven vertically extending sidewalls 11 and a concave, "pre-stressed" section 50. FIG. 4 shows the "pre-stressed" section 50, which is made up of six generally triangular facets 52 shown inclined inwardly from vertical. The section 50 is intentionally made slightly concave so that when the product tank 4 is pressurized and placed adjacent another pressurized product tank 4, their "pre-stressed" sections 50 act as complementary portions which can be positioned closely adjacent without transmitting excessive force against each other. Outward bulging of the pre-stressed section 50 which may occur while the tanks 4 are under pressure is minimized in the "pre-stressed" section 50 by the use of the triangular facets 52 rather than a curved surface. The section 50 in the preferred embodiment is shown replacing one of the sidewalls 11 at the rear of the product tank 4 in each of the second and third tiers 49, 51. However, the section 50 may be alternately configured to replace all or a portion of any number of sidewalls 11 on any of the first, second, third or fourth tiers 47, 49, 51, 53. The "pre-stressed" section 50 may be unnecessary where only a single tank 4 is used or in some other applications.

Although any regular polygon of more than four sides in plan will attain interior angles between adjacent side walls 11 of greater than 90°, (108° for a regular pentagon, 120° for a regular hexagon, etc.) forming the dome portion 43 as an irregular polygon in plan or as viewed at some other angle may be desirable in some applications. For instance, it may be desirable to position the funnel portion 41 at a specific location for dispensing product or for relocating the center of gravity of the product tank 4. The product tank 4 of FIGS. 1–4 is shown as a regular octagon in plan (FIG. 3) where the opening 5 at the top and the material outlet 45 are offset, making the dome portion 43 an irregular three-dimensional shape whose interior angles between adjacent side walls 11 are all greater than 115°.

Preferably, the domed portion 43 of the product tank 4 is substantially polyhedral, that is, made up of generally planar sidewalls 11, so that the individual sidewalls 11 will not tend to cave in. However, use of many smaller sidewalls 11 separated by thicker joints 13 would be advantageous even if the panels forming the sidewalls 11 were slightly convex.

Also, the product tank 4 is preferably constructed of plastic. Plastic tanks have increased corrosion and leakage resistance and tend to cost and weigh less than metallic tanks. Even so, application of a similar shape to metallic tanks will offer many advantages over conventional metal designs.

Most preferably, the tank 4 will be constructed from a polyethylene plastic resin such as the type sold under the trade name MOBIL M134. Such a plastic is readily adaptable to a roto-molding process so that the dome portion 43 and the funnel portion 41 of the product tank 4 can easily be integrally formed. In addition, as a natural result of a roto-molding process, the joints 13 between sidewalls 11 will tend to be thicker than the flat panels of the sidewalls 11 themselves and will also tend to be rounded somewhat, smoothing the transition between adjacent sidewalls 11 and further reducing stress concentrations. Also, plastics of the type described are available in a variety of colors, many of which will allow (depending on the thickness of the tank) the product tank 4 to be translucent so that an operator may readily determine the level of product contained in the product tank 4.

The thickness of sidewalls 11 and joints 13 needed in a particular tank 4 will depend mainly on the material used and the pressure and product capacity requirements of the application for which the tank 4 is intended. For example, a product tank 4 with 200 bushel capacity for use in an air seeder and pressurized less than 1.5 p.s.i. could be made 7 mm thick at its sidewalls 11 and 8 mm at its joints 13.

The present invention should not be limited by the above described embodiments, but should be limited solely by the claims that follow.

We claim:

1. A product tank for containing product under pressure, said product tank comprising:
    a lower funnel portion terminating at a product outlet;
    an upper dome portion immediately above the lower funnel portion having a product-containing capacity substantially greater than the lower funnel portion, said upper dome portion in substantially gas-tight communication with the lower funnel portion; and
    said upper dome portion of the product tank including a plurality of substantially planar surfaces adjacent to each other forming side walls of the upper dome portion, wherein each interior angle between adjacent side walls of the upper dome portion is greater than ninety degrees.

2. The product tank of claim 1 wherein the adjacent side walls are separated by a joint member which is thicker than either of the adjacent side walls.

3. The product tank of claim 1 wherein the upper dome portion includes first, second, third and fourth tiers of side walls, each of the first, second, third and fourth tiers of side walls circumscribing the dome portion of the product tank.

4. The product tank of claim 3 wherein the first and fourth tiers of side walls includes eight generally planar surfaces, the second and third tiers of side walls each include seven generally planar surfaces and a concave section.

5. The commodity cart of claim 4 wherein the concave section comprises a plurality of generally triangular facets inclined inwardly from adjacent sidewalls of the product tank.

6. The product tank of claim 4 wherein the product tank includes a door at its upper end, said door having a releasable, substantially gas-tight seal.

7. The product tank of claim 1 wherein the product tank is constructed of translucent plastic.

8. In an agricultural implement having a frame, a plastic product tank for containing product under pressure, said product tank comprising:
    a lower funnel portion terminating at a product outlet;
    an upper dome portion immediately above the lower funnel portion having a product-containing capacity substantially greater than the lower funnel portion, said upper dome portion integrally formed with the lower funnel portion in substantially gas-tight communication with each other; and
    said upper dome portion of the product tank including a plurality of substantially planar surfaces adjacent to each other forming side walls of the upper dome portion, wherein each interior angle between adjacent side walls of the upper dome portion is greater than ninety degrees.

9. The product tank of claim 8 wherein the adjacent side walls are separated by a joint member which is thicker than either of the adjacent side walls.

10. The product tank of claim 8 wherein the upper dome portion includes first, second, third and fourth tiers of side walls, each of the first, second, third and fourth tiers of side walls circumscribing the dome portion of the product tank.

11. The product tank of claim 10 wherein the first and fourth tiers of side walls includes eight generally planar surfaces, the second and third tiers of side walls each include seven generally planar surfaces and a concave section.

12. The product tank of claim 11 wherein the concave section comprises a plurality of generally triangular facets inclined inwardly from adjacent sidewalls of the product tank.

13. The product tank of claim 11 wherein the product tank includes a door at its upper end, said door having a releasable, substantially gas-tight seal.

14. The product tank of claim 8 wherein the product tank is constructed of translucent polyethylene.

15. A commodity cart for use in an air seeder, said commodity cart comprising:
    a frame;
    a plurality of wheels mounted to the frame;
    a plastic product tank for containing product under pressure, said product tank supported on the frame;
    said product tank including a lower funnel portion terminating at a product outlet and an upper dome portion immediately above the lower funnel portion having a product-containing capacity substantially greater than the lower funnel portion;
    a meter coupled to the product outlet; and
    said upper dome portion in substantially gas-tight communication with the lower funnel portion and including a plurality of substantially planar surfaces adjacent to each other forming side walls of the upper dome portion, wherein each interior angle between adjacent side walls of the upper dome portion is greater than ninety degrees.

16. The commodity cart of claim 15 wherein the adjacent side walls are separated by a joint member which is thicker than either of the adjacent side walls.

17. The commodity cart of claim 15 wherein the upper dome portion includes first, second, third and fourth tiers of side walls, each of the first, second, third and fourth tiers of side walls circumscribing the dome portion of the product tank.

18. The commodity cart of claim 17 wherein the frame is adapted for supporting a plurality of product tanks.

19. The commodity cart of claim 18 wherein the first and fourth tiers of side walls includes eight generally planar surfaces, the second and third tiers of side walls each include seven generally planar surfaces and a concave section which circumscribe the upper dome portion.

20. The commodity cart of claim 19 wherein the concave section comprises a plurality of generally triangular facets inclined inwardly from adjacent sidewalls of the product tank.

21. The commodity cart of claim 20 wherein the concave sections adjoin one another when the tanks are mounted on the frame.

22. The commodity cart of claim 15 wherein the product tank includes a door at its upper end, said door having a releasable, substantially gas-tight seal.

23. The commodity cart of claim 15 wherein the product tank is constructed of translucent polyethylene.

* * * * *